United States Patent
Gross

(10) Patent No.: US 6,595,484 B1
(45) Date of Patent: Jul. 22, 2003

(54) WALL STRUCTURE HAVING A DEFORMABLE MULTI-WALLED AREA FOR VARYING A CROSS SECTION OF A FLOW CHANNEL

(76) Inventor: Heinz Gross, Ringstrasse 137, D-64380 Rossdorf (DE)

( * ) Notice: Subject to any disclaimer, the term of this patent is extended or adjusted under 35 U.S.C. 154(b) by 0 days.

(21) Appl. No.: 09/743,607

(22) PCT Filed: Jul. 1, 1999

(86) PCT No.: PCT/EP99/04528

§ 371 (c)(1),
(2), (4) Date: Feb. 28, 2001

(87) PCT Pub. No.: WO00/04317

PCT Pub. Date: Jan. 27, 2000

(30) Foreign Application Priority Data

Jul. 14, 1998 (DE) .......................... 198 31 540

(51) Int. Cl.⁷ ................................. F16K 7/04
(52) U.S. Cl. ......................... 251/7; 251/331
(58) Field of Search .............. 137/15.18; 251/8, 251/7, 331, 335.2, 61.1; 264/642; 29/890.12

(56) References Cited

U.S. PATENT DOCUMENTS

| | | | |
|---|---|---|---|
| 2,918,089 A | * 12/1959 | McFarland, Jr. ............ 251/331 |
| 3,268,201 A | * 8/1966 | Little ........................ 251/331 |
| 3,850,568 A | * 11/1974 | Bartha et al. .............. 425/466 |
| 3,884,611 A | * 5/1975 | Anderson et al. .......... 425/466 |
| 4,199,981 A | 4/1980 | Young |
| 4,279,857 A | 7/1981 | Feuerherm |
| 4,326,695 A | * 4/1982 | Lincoln ........................ 251/8 |
| 4,901,751 A | * 2/1990 | Story et al. ................ 251/331 |
| 5,110,518 A | 5/1992 | Halter |
| 5,385,269 A | 1/1995 | Richter et al. |
| 5,788,998 A | 8/1998 | Gross |
| 6,099,290 A | 8/2000 | Gross |

FOREIGN PATENT DOCUMENTS

| | | |
|---|---|---|
| DE | 1 161 412 | 1/1964 |
| DE | 1 704 850 | 3/1971 |
| DE | 28 23 999 | 6/1984 |
| FR | 2 758 382 | 7/1998 |

* cited by examiner

Primary Examiner—Ehud Gartenberg
Assistant Examiner—John Bastianelli
(74) Attorney, Agent, or Firm—Burns, Doane, Swecker & Mathis, LLP

(57) ABSTRACT

A wall structure forms a fluid flow channel and includes a deformable multi-wall area for varying a cross-section of the flow channel. The wall structure comprises a homogeneous material. The wall structure is made by sequentially applying layers of a material to one another such that in a region of the wall structure corresponding to the multi-wall area layers do not adhere to one another, to form individual walls disposed adjacent one another in the direction of the thickness of the wall structure.

20 Claims, 4 Drawing Sheets

WALL STRUCTURE HAVING A DEFORMABLE MULTI-WALLED AREA FOR VARYING A CROSS SECTION OF A FLOW CHANNEL

BACKGROUND OF THE INVENTION

The invention relates to a flow-channel wall for partial modification of the flow channel cross section.

Locally limited, adjustable, round or annular flow channels are known from DE-A-11 61 412, DE-A-17 04 850, DE-A-26 54 001 (corresponding to U.S. Pat. No. 4,279,857), DE-A-28 23 999, DE-A40 13 610 (corresponding to U.S. Pat. No. 5,110,518). Slotted flow channels, which may be locally deformed, are described in DE 44 00 069 (corresponding to U.S. Pat. No. 5,788,998) as well as in DE-A-195 35 930 (corresponding to U.S. Pat. No. 6,099,290) In case of round devices, the deformable area of the flow channel is designed in a single-walled manner. The use of this known device is limited based on its particular construction whereby relatively rigid single-walled ring elements are employed, which have to be deformed to a diameter in the range of larger than 100 mm through the use of screws. Smaller flow channel cross sections cannot be modified with these solutions (methods).

Should one want to additionally obtain locally limited large modifications of the flow channel cross section, as it is needed in practice, then these constructions are unsuitable as well because the obtainable absolute deformation of the ring elements is very small even at the most flexible solution with its approximately 200 micrometers ($\mu$m) as disclosed in DE-A40 13 610. The reason for this is that one may deform the ring element only within their linear-elastic deformation range to ensure that they resume the exact original shape after resetting the adjustment element.

The ring element described in DE-A-11 61 412 has however the advantage that no sealing problem occurs at reduced flexibility using the described solution. The described solution in DE-A-26 54 001 (U.S. Pat. No. 4,279,857) and DE-A-28 23 999 are somewhat more flexible but have a certain degree of leakage as a trade-off since the rings must be displaced in the area of the sealing surface during adjustment. In addition, the rings create minor dead spaces within the flow channel while they are being deformed, which may lead to undesirable material stagnation and material degradation in the mass flow.

In DE-A-44 00 069 (U.S. Pat. No. 5,788,998), the deformable area in the slotted flow channel is also only single-walled. In contrast, in DE-A-195 35 930 (U.S. Pat. No. 6,099,290) there is a device described whereby the linear—elastic adjustment area is enlarged by the integration of a (metal) sheet stack into a flow channel. However, this known solution has weakness in relation to its production and mechanical stability. In terms of production technology, it is often very difficult or even impossible to weld a sheet stack to the desired location. The welding of very thin metal sheets, which would be especially flexible, usually creates problems. Whenever welding is principally possible, then unavoidable weld stresses occur during welding, which leads to distortion in many cases. Even in case of distortion-free welding, the deformation capacity of the sheet stack is reduced by the welding stress whereby the welding seam is additionally always a mechanical weak spot. Furthermore, the strength of the flow channel wall is limited in relation to the interior pressure (under which pressure lies the medium flowing through the channel) since only the so-called flow channel sheet is welded around its entire circumference to the flow channel body. The remaining sheets of the sheet stack contribute only marginally to the pressure resistance of the flow channel wall in the known solution since they are welded to the flow channel body only at one side of their four sides. We are dealing therefore with sheets (plates) that are mounted one-sided, seen in a static sense.

To this end, methods are employed in various industrial applications whereby it would be desirable to modify purely elastically particular areas of a flow channel in their geometry to the highest degree possible in an operating facility or during a running process without having to adopt the disadvantage of the known solution. It is therefore the object of the invention to provide a device of the generic type in such a manner that generally there is made possible, relative to the state-of-the art, an enlarged absolute adjustment area and larger relative adjustment in relation to close, neighboring areas of the flow channel geometry while having possibly additional greater interior pressure resistance. Thereby, it should be ensured at the same time that no leakages and no dead spaces can occur and that flow channels with very complex geometries (shapes) may be produced as well.

A device can be realized with the present invention with which a mass may be moved through a flow channel, for example, whereby during the flow through the flow channel, the flow velocity of the mass may be locally limited in a large measure either manually or by means of a guiding or control device, or the flow velocity may be altered by mere linear-elastic deformations of one section of the flow-channel wall. However, a prerequisite for this is that the local mass flow may be adjusted at particular locations in a desirable manner relative to adjacent flow channel sections.

SUMMARY OF THE INVENTION

This object is achieved according to the invention in that the flow-channel wall 9 consists of homogeneous material and is multi-walled at least in partial areas.

A wall area is thereby integrated into a flow channel whereby said wall area consists of homogeneous material and which is multi-walled in partial areas. Homogeneous material is to be understood in the framework of this application that the single-walled areas of the flow-channel wall and the individual walls of the multi-walled area consist of exactly the same material, whereby even in the transition areas from the multi-walled area to the single-walled area there are no non-homogeneous elements such as glued or welded seams, for example. Homogeneous, in the sense of this application, is also a wall that consists of multi-component material, such as CFK, as long as the composition of the flow-channel wall in the single-walled area is identical in the transition zone and in the multi-walled area. The material is also homogeneous in the sense of the application if one partial area of the single-walled flow-channel wall has been manufactured in one piece together with the transition area and one individual wall of the multi-walled area. In the sense of this application, a flow-channel wall is multi-walled when a cross section that is perpendicular to the flow direction, cuts through at least two individual walls. This multi-walled construction has the advantage that the flow-channel wall may be modified in a simple manner through variation of the thickness of the individual walls and the number of individual walls. Thereby, a varying strength of the flow-channel wall can achieved relative to the interior pressure of the flowing mass. Should one strive for extremely high flexibility, then one has to select extremely thin walls. Should the flow-channel wall have to additionally withstand a high interior pressure, then it is of advantage to choose a high number of individual walls in the multi-walled area and to increase thereby the total thickness D in the multi-walled area. The linear-elastic deformation area, and thereby the flexibility of the flow-channel wall, is reduced to a very low degree compared to designing the area in a single-walled manner with the same total thickness D since the maximum expansion occurring in the flow-channel wall at the same deformation is less than in the multi-walled case. In addition, the solution according to the invention has also the advantage that all individual walls are firmly connected at all sides to the bordering flow channel body whereby said individual walls can absorb pressure forces in the same manner as the flow channel (metal) sheet. In contrast to the state-of-the-art, the individual walls are walls that are firmly mounted at all sides.

Such flow-channel walls may be employed in flow channels for gaseous as well as liquefied mediums. One can adjust a wide air flow in its intensity and across it width very accurately, for example in a screen printing device, with which one prints a strip across a larger width, or one distributes fluid across a wider area. In the scope of printing technology, the distribution of the stream of printing ink, which flows through a slotted flow channel, may be adjusted by means of the inventive device in an ideal manner. Finally, there are many and diverse employment possibilities in processing of synthetic material by controlling the melt-flow distribution in a tool. Such flow-channel walls may be integrated into all conceivable flow channel geometries. However, the most common are slotted, round and annular flow channel geometries.

The flow-channel wall consists of homogeneous material and is designed partially multi-walled for the purpose of partial deformation. Such flow-channel walls can be advantageously integrated into tools wherein there is the requirement that the geometry of the flow channel provided in the tool may be specifically altered at certain locations.

BRIEF DESCRIPTION OF THE DRAWINGS

Additional details are shown in the following description and accompanying drawings of individual embodiments of the device and individual processing arrangements.

DETAILED DESCRIPTION OF PREFERRED EMBODIMENTS OF THE INVENTION

Figure 1:
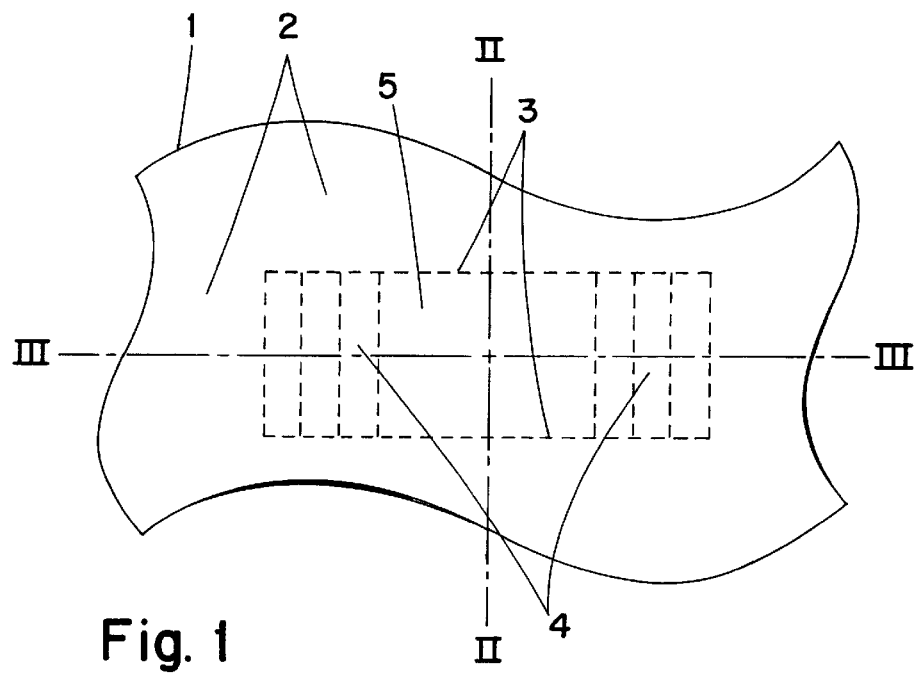
FIG. 1 shows in a top view a homogeneous flow-channel wall that is multi-walled in a partial area.
Figure 2:
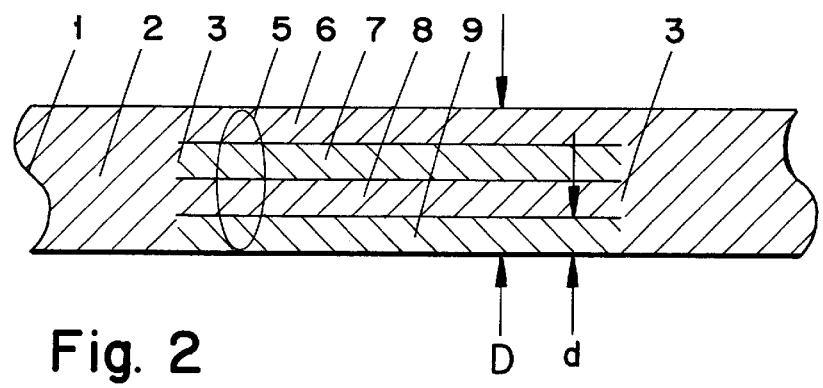
FIG. 2 shows a sectional view along line II—II according to FIG. 1.
Figure 3:
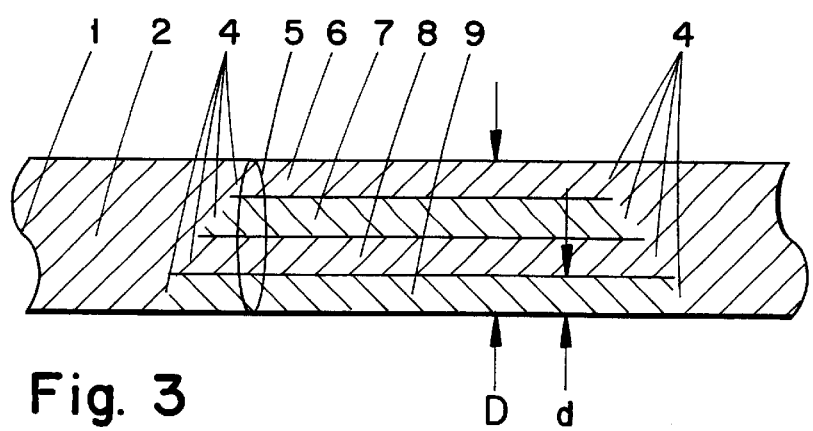
FIG. 3 shows a sectional view along line III—III according to FIG. 1.
Figure 5:
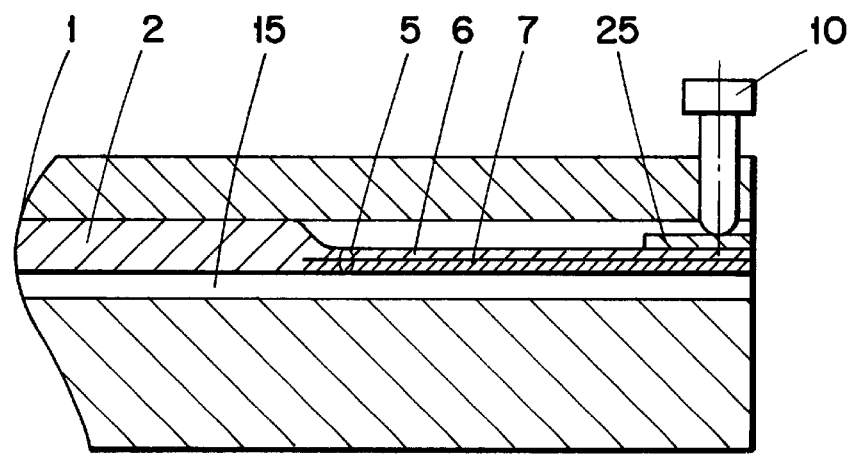
FIG. 5 shows a sectional view of a device whereby the multi-walled flexible area is disposed at the end of the flow channel.

In a top view of an inventive flow-channel wall 1, as shown in FIG. 1, one can see undisturbed homogeneous transition areas 3 and 4 between respective portions of the single-walled area 2 and the multi-walled area 5 of the flow-channel wall 1. As is apparent from FIGS. 1, 2 and 3, the undisturbed transition areas define a transition wall arrangement surrounding the multi-wall area as viewed in the thickness direction of the wall 1, i.e., as viewed in FIG. 1. Undisturbed means in this case that no material changes exist on the surface of the flow-channel wall and there are no joint seams present, such as welding seams or glue seams, for example. That means that one cannot see the multi-walled area 5 of the plate in the top view. The multi-walled area 5 of the flow-channel wall 1 together with the individual walls 6–9 may be seen only in the sectional view along II—II (FIG. 2) and III—III (FIG. 3). The wall thickness d of the individual walls 6–9 should be thinner than 2 mm to allow for high elasticity of the multi-walled area 5, preferably some should be even smaller than 1 mm to keep the maximum expansion to a minimum on the surfaces of the individual walls 6–9 during deformation. It may also be advantageous in special cases to use individual walls with a thickness d in the micrometer (micron) range. It may be advantageous in some cases if the flow-channel wall 1 is supported at one side, at least partially, by an additional wall 25, as it is shown in FIG. 5. Of course, several support walls 25 could also be employed.

Figure 4:
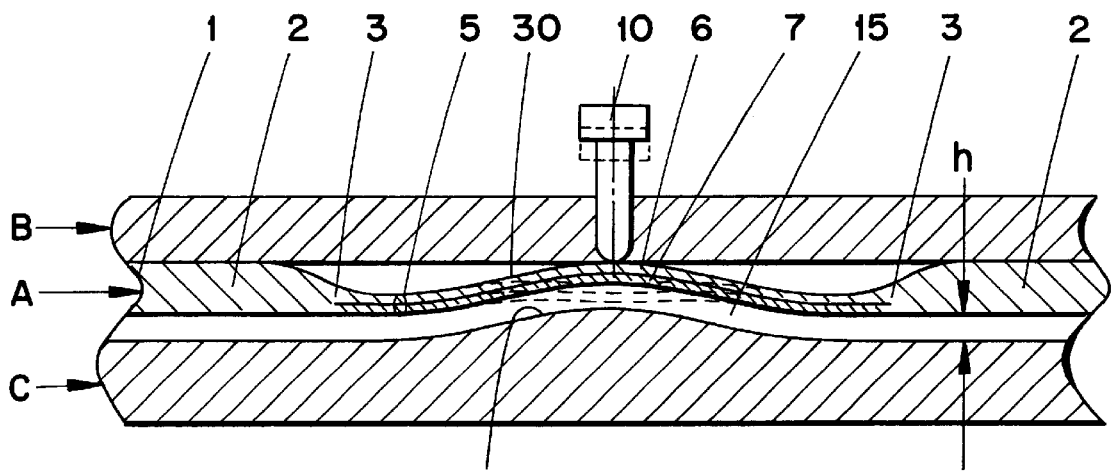
FIG. 4 shows a sectional view through a flow channel section in which the mulit-walled area is designed in a curved manner.

For a possibly required (higher) strength it may be of advantage if the flow-channel wall 1 consists of a material having a strength of more than 800 MPa (mega-Pascal), preferably even a strength of more than 1,200 MPa. In special cases it may also be advantageous if the individual wall thickness d is reduced along a particular section in the multi-walled area to increase flexibility. The linear-elastic deformation area of the multi-walled area 5 can be enlarged in slotted flow channels if the multi-walled area 5 is curved in one or in several dimensions. FIG. 4 shows a flow channel area that is curved in the direction of flow. If one applies pressure at a location of the multi-walled area 5 (illustrated by a dotted line) by means of an adjustment screw 10, then only the bending radii of the curvature are modified. Should there be no curvature, as for instance in FIGS. 1–3, then the multi-walled area would have to change in its length at the least displacement, which would lead to additional undesirable tensile stresses in the multi-walled area. The unavoidable bending stresses would be combined with these tensional stresses, which would lead to a reduction in the obtainable linear-elastic deformation and the flow channel 15 could thereby be reduced in its height h by a small degree in the area of the adjustment screw 10. It is advantageous in many cases if the multi-walled area 5 forms the end of a flow-channel 15, as shown in FIG. 5.

Figure 6:
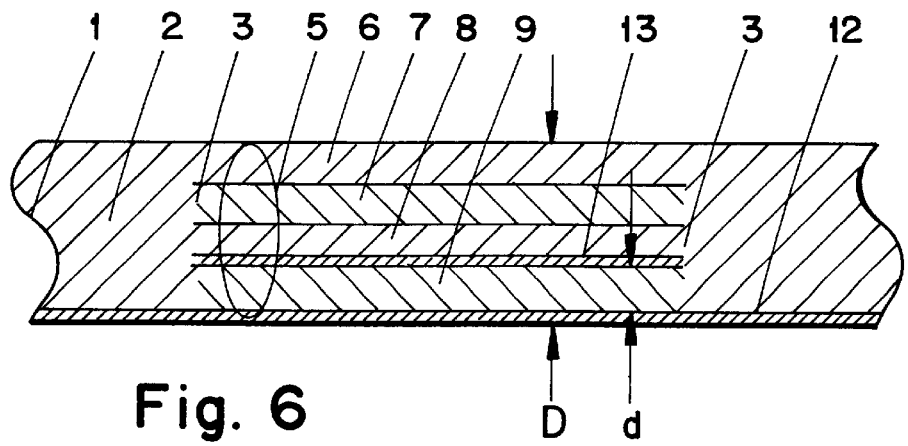
FIG. 6 shows a sectional view of a flow-channel wall whereby layers of different material are disposed on individual walls.
Figure 7:
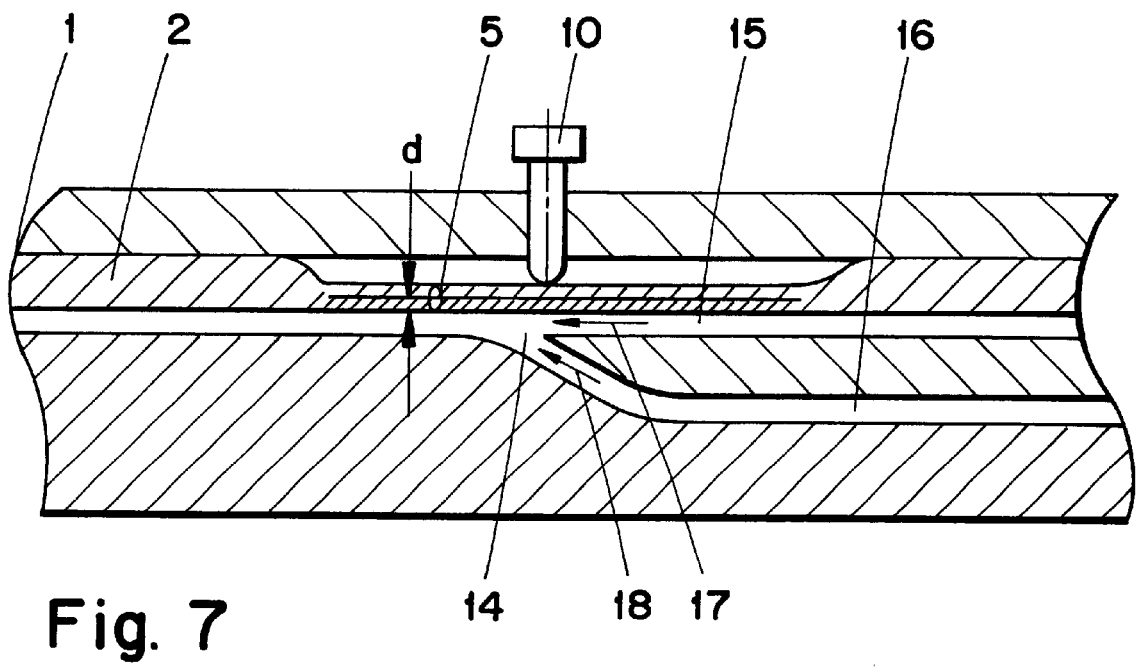
FIG. 7 shows a sectional view of a flow channel section in which two flow channels are merging.

It can be frequently of advantage if an additional layer 12 made of different material is provided in the multi-walled area 5 on at least one individual wall 9—or if an intermediate layer 13 made of different material is provided in the multi-walled area 5 between at least two individual walls 8 and 9, as shown in FIG. 6. This may be a sliding layer or an anti-corrosion layer 12 on the flow channel surface, for example, or also a sliding layer or a separating layer 13 between the individual walls 8 and 9. It is especially interesting if the multi-walled area 5 of the flow-channel wall 1 is arranged in the merging area 14 of two or more flow channels 15 and 16, as illustrated in FIG. 7. Thereby the second mass flow 19 flowing into the main mass flow 17 may be modified in its width and its circumference (locally limited) by means of a simple adjustment screw 10, for example. In place of the adjustment screw 10, other systems may also be employed as adjustments means, such as hydraulic or pneumatic adjustment systems, or thermal expansion bolts, piezo translators and adjustment drives, for example.

Figure 8:
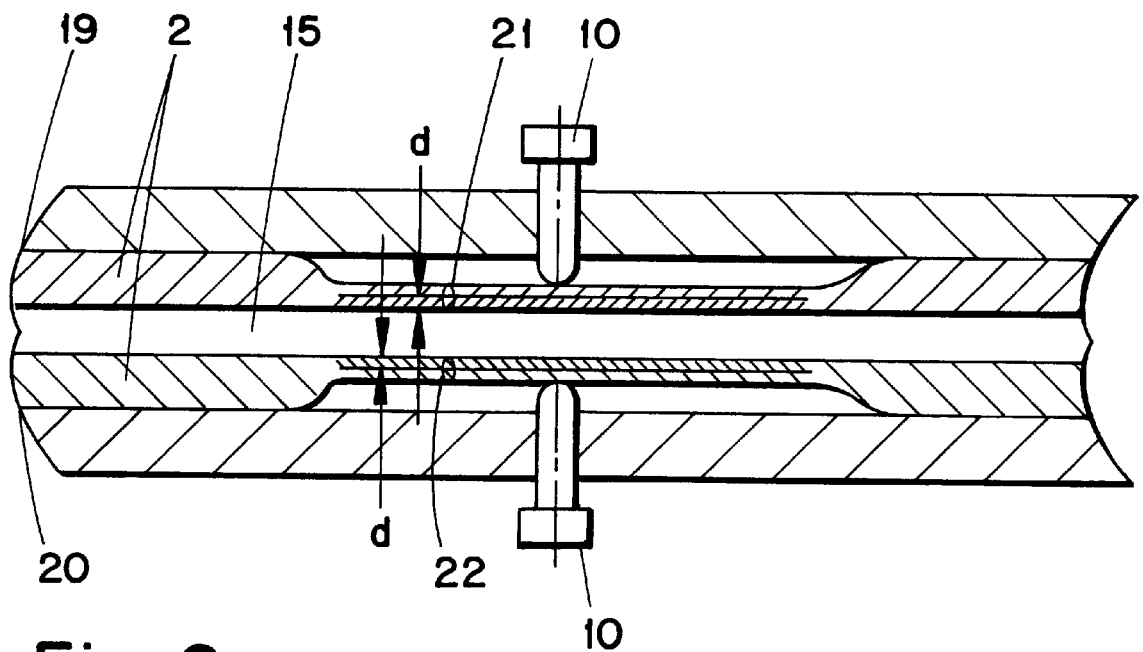
FIG. 8 shows a sectional view of a flow channel section in which two flexible multi-walled flow-channel walls are integrated.
Figure 9:
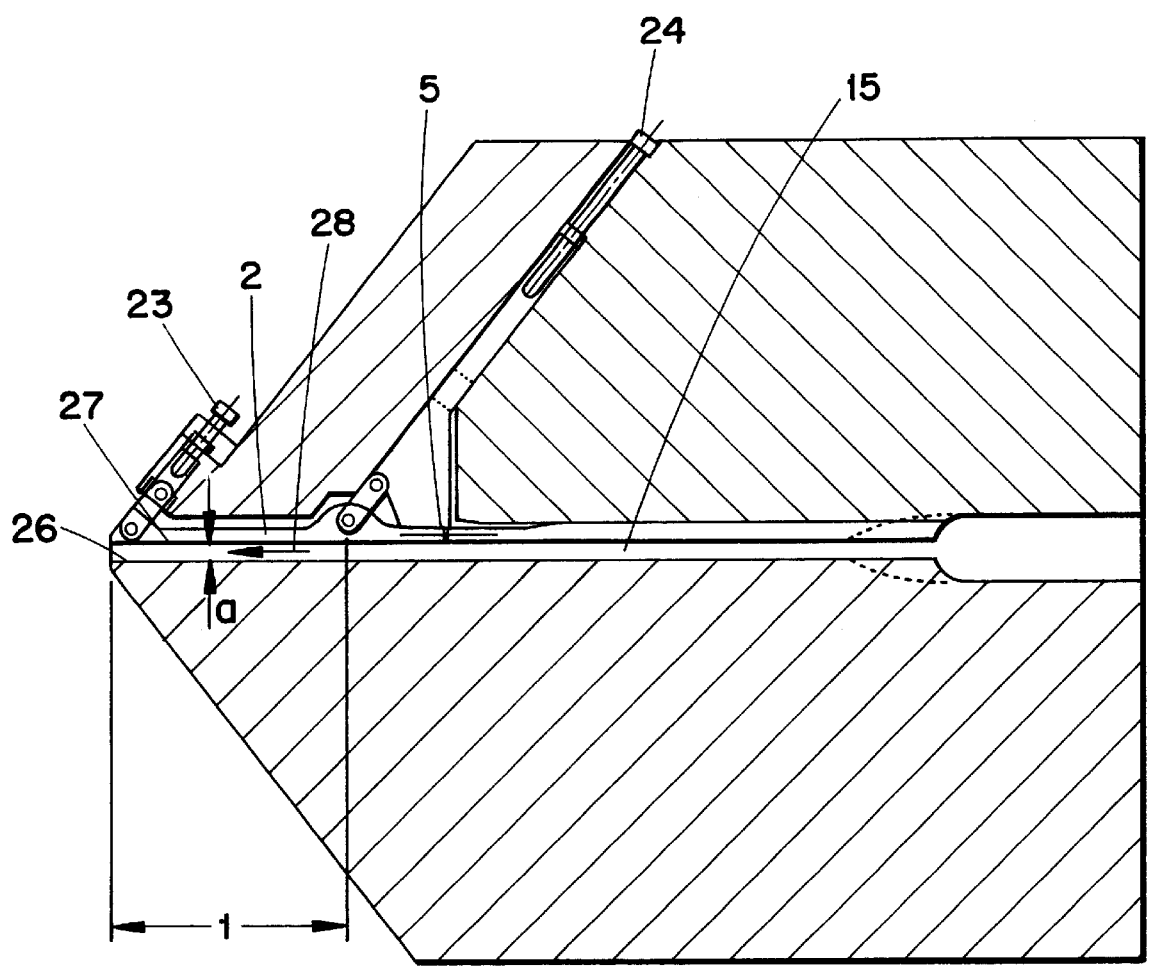
FIG. 9 shows a sectional view of a tool which flow-channel walls are partially parallel adjustable in the flow direction.

Of course, an even larger adjustment effect can be obtained if, as shown in FIG. 8, at least in one area of a flow-channel wall 15, several flow-channel walls 19 and 20 consist each of a partial multi-walled flow channel, and if the multi-walled areas 21 and 22 can be locally deformed at least partially by means of exterior adjustment elements. Should one arrange, for example, the multi-walled areas 21 and 22 in such a manner that they are disposed opposite to one another, as shown in FIG. 8, then a double-fold throttle effect can be achieved whereby both multi-walled areas 21 and 22 are adjusted to each other by means of the adjustment screw 10. In the device shown in FIG. 9 there is shown the distance a between two flow-channel walls 26 and 27 (forming the flow channel 15) parallel adjustable at least partially by more than 0.2 mm in the flow direction 28 by means of suitable adjustment systems 23 and 24 along a particular length 1. Preferably, the length 1 should be greater than 5 mm. This can be achieved, for example, whereby the flow-channel wall 2 is adjusted with the aid of two independent adjustment systems 23 and 24. This is always of an advantage if during its use, stabilization of flow is wanted after the flow channel modification.

It is of advantage in all devices if the individual walls 6–9 lie closely on top of each other so that they mechanically support one another. In case of local adjustment of the multi-walled area 5, there is always a continuous change in the flow channel geometry so that dead water zones are prevented in which the flow velocity is close to zero. In addition, no leakage can occur in the adjustment area because of the homogeneous flow-channel wall, which has no separating surfaces.

Such multi-walled flow-channel walls 1, as shown in FIGS. 1–9, may be produced according to the invention in that the flow-channel wall is manufactured step-by-step by means of a chemical or physical separating process, or by means of injection, coating and lamination processes, or by means of a sinter process, or similar layering processes. The surface of each individual wall 6–9 in the multi-walled area 5 is treated in such a manner whereby during a subsequent production step, the newly applied layer does not bond with the surface of the individual wall 6–9 that was produced previously. Of course, one can interrupt this process at any time. The galvanic separation of such multi-walled flow-channel wall 1 is described hereby as an example. On a model, which has the exact geometry as the desired flow channel surface, a first nickel layer is separated having the thickness of the desired individual wall 6. Subsequently, the separating process is interrupted and the free surface of the separated layer is inactivated in area 5 whereby the flow-channel wall is designed in a multi-walled manner. Inactivating means in this case that the surface is treated in such a manner that during continuation of the separating process in the treated area 5, no bonding is possible between the newly separated layer 7 and the already existing first layer 6. This can be achieved, for example, by coating with separating lacquers or also by applying separating foils by gluing. On the outside of the inactivated area, the layer will firmly bond with the first already separated layer so that the flow-channel wall 1 becomes single-walled in this area. Only in the inactivated area there will be a second flow-channel wall 7 created, which changes gradually and homogeneously into a single-walled area 2 at its border areas 3 and 4. This process may be principally repeated as often as needed so that any number of individual walls 6–9 can be produced in this manner, which then gradually change homogeneously into a single-walled flow-channel wall area 2. It is of advantage in many applications of such multi-walled flow-channel walls 1 if the inactivation layer functions simultaneously as a sliding layer between the individual walls to reduce friction between the surfaces of the individual walls 6–9 during deformation. However, an intermediate layer 13 for inactivation does not have to be employed necessarily. The surfaces of the individual walls may be inactivated also by modification of the surface layers or the surface tension. In these cases, no intermediate layer of different material is produced between the individual walls 6–9. The manufacturing processes, according to the invention, also ensure that the individual walls 6–9 support one another since they are arranged automatically very close on top of each other based on the method used during the manufacturing process—even in case of complex multi-dimensional wall geometries.

What is claimed is:

1. A wall structure defining a fluid flow channel and comprising homogeneous material, the wall structure including a single-wall area and an integral deformable multi-wall area for varying a cross section of the flow channel, wherein the multi-wall area is defined by a multitude of individual walls disposed adjacent each other in a thickness direction of the wall structure, the individual walls transforming into the single-wall area at a transition area arrangement surrounding the multi-wall area as viewed in the thickness direction, wherein the individual walls are of integral, one-piece, homogenous relationship with the single-wall area.

2. The wall structure according to claim 1 wherein a thickness of each of the individual walls is less than 2 mm.

3. The wall structure according to claim 1 further including a support wall disposed on one side of the multi-wall area.

4. The wall structure according to claim 1 wherein the material of the wall structure has a strength greater than 800 mega-Pascal.

5. The wall structure according to claim 1 wherein the multi-wall area is curved as viewed in a sectional plane taken through the wall structure.

6. The wall structure according to claim 1 wherein the multi-wall area forms an end of the flow channel.

7. The wall structure according to claim 1 wherein one of the individual walls is coated with a material different from that which the multi-wall area is formed.

8. The wall structure according to claim 1 wherein an intermediate layer of material is positioned between at least two adjacent ones of the individual walls, the material of the intermediate layer being different from the material from which the multi-wall area is formed.

9. The wall structure according to claim 1 wherein the flow channel constitutes a first flow channel, the wall structure forming a second flow channel merging with the first channel at a merging area, the multi-wall area situated at the merging area.

10. The wall structure according to claim 1 further including an adjustment element accessible from an exterior of the multi-wall area and arranged to locally deform the multi-wall area.

11. The wall structure according to claim 1 wherein the flow channel is defined between two opposing wall portions of the wall structure that are relatively movable in a direction parallel to a direction of fluid flow through the flow channel, the wall portions being spaced from the multi-wall area.

12. The wall structure according to claim 1 further including an adjustment mechanism for moving one of the wall portions relative to the other in the direction parallel to the direction of fluid flow.

13. A method of manufacturing a wall structure that defines a fluid flow channel and includes an integral deformable multi-wall area for varying a cross-section of the flow channel, the method comprising sequentially applying layers of a material in a region of the wall structure corresponding to the multi-wall area, the layers do not adhere to one another to form individual walls disposed adjacent one another in a direction of a thickness of the wall structure.

14. The method according to claim 13 wherein the layers are applied by a chemical separation process.

15. The method according to claim 13 wherein the layers are applied by a physical separation process.

16. The method according to claim 13 wherein the layers are applied by injection.

17. The method according to claim 13 wherein the layers are applied by a coating-and-lamination process.

18. The method according to claim 13 wherein the layers are applied by a sintering process.

19. A wall structure comprising:

first and second spaced apart walls;

an intermediate wall disposed between the first and second walls and including single-walled areas interconnected by an integral multi-walled area,
- the single-walled areas abutting the first wall and spaced from the second wall to form a flow channel therewith,
- the multi-walled area defined by a plurality of individual walls disposed adjacent each other in a thickness direction of the wall structure, the multi-walled area being thinner than the single-walled areas in the thickness direction and including a curved section that is curved away from the second wall; and an adjustment element accessible from an exterior of the first wall for reversing a curvature of the curved section by deforming the curved section toward the second wall, to vary a cross section of the flow channel.

20. The wall structure according to claim 19 wherein a portion of the second wall is curved toward the curved section of the multi-walled area with a curvature generally corresponding to the curvature of the curved section before the curved section is deformed by the adjustment element.

* * * * *